United States Patent [19]

Narumi et al.

[11] Patent Number: 4,990,323
[45] Date of Patent: Feb. 5, 1991

[54] COMPOSITION FOR REDUCTION-REOXIDATION TYPE SEMICONDUCTIVE CERAMIC CAPACITOR

[75] Inventors: Kazuhito Narumi, Bibai; Fumio Takeuchi; Michiaki Sakaguchi, both of Iwamizawa, all of Japan

[73] Assignee: Nippon Oil & Fats Co., Ltd., Tokyo, Japan

[21] Appl. No.: 365,793

[22] Filed: Jun. 14, 1989

[30] Foreign Application Priority Data

Jul. 1, 1988 [JP] Japan .................................. 63-162568

[51] Int. Cl.$^5$ ............................................. C01G 23/00
[52] U.S. Cl. ....................................... 423/593; 423/598
[58] Field of Search ................................ 423/593, 598

[56] References Cited

U.S. PATENT DOCUMENTS 4,233,282 11/1980 Arendt ................................. 423/593
4,487,755 12/1984 Arendt ................................. 423/593
4,534,956 8/1985 Arendt ................................. 423/593

FOREIGN PATENT DOCUMENTS 2084986 9/1970 United Kingdom .
1531105 11/1978 United Kingdom .
1204436 4/1982 United Kingdom .

Primary Examiner—Peter D. Rosenberg
Attorney, Agent, or Firm—Oblon, Spivak, McClelland, Maier & Neustadt

[57] ABSTRACT

A composition for a reduction-reoxidation type semiconductive ceramic capcitor is disclosed which consists substantially of 100 mol % of a barium composite oxide consisting of $BaTiO_3$ and $BaZrO_3$ and having a $BaZrO_3$ content in the range of 0 to 20 mol %, 0.3 to 3.0 mol % of $Bi_2O_3$, and 0.1 to 8.5 mol % of at least one member selected from the group consisting of $TiO_2$ and $ZrO_2$ and further incorporates therein 0.001 to 1.00% by weight of at least one member selected from the group consisting of the oxides of Cr, Fe, Co, Zn, Cu, Al, Si, and Mg. This composition possesses a breakdown voltage of not less than 400 V, an insulation resistance of not less than $10^9 \Omega$, an electrostatic capacity of not less than 0.65 $\mu F/cm^2$ per unit surface area, and a magnitude, tan $\delta$, of less than 2.5%.

4 Claims, No Drawings

COMPOSITION FOR REDUCTION-REOXIDATION TYPE SEMICONDUCTIVE CERAMIC CAPACITOR

BACKGROUND OF THE INVENTION

1. Field of the Invention

This invention relates to improvements in and concerning a composition for a reduction-reoxidation type semiconductive ceramic capacitor produced by forming an insulating layer on the outer periphery of a semiconductive ceramic article by reoxidation.

Compact, high quality components for electronic equipment are in strong demand. This is also true of reduction-reoxidation type semiconductive ceramic capacitors, which have come to require high insulation resistance and breakdown voltage, small size, large capacity and small dielectric loss.

2. Prior Art Statement

Reduction-reoxidation type semiconductive ceramic capacitors are the subject of numerous patent publications and technical papers. Of such capacitors, those which have been practically applied are such that when the temperature characteristic of electrostatic capacity is fixed in the range of +20 to +30%, the dielectric constants thereof are so low as to fall in the range of 3,000 to 5,000. Japanese Patent Public Disclosure SHO No. 53(1978)-114100 discloses a ceramic material having a Ni compound incorporated in a $BaTiO_3$-$BaZrO_3$-$Bi_2O_3$-$TiO_2$ type solid solution. The ceramic capacitor composed of this material exhibits such characteristic properties as 0.57 $\mu F/cm^2$, tan $\delta$ 4.3%, an insulation resistance of 200 $M\Omega/cm^2$ (15 VDC, after 15 seconds' standing), and a temperature characteristic (%) of electrostatic capacity at $-30°$ to $85°$ C. within $\pm 30\%$. Japanese Patent Public Disclosure SHO No. 62(1987)-30481 discloses a ceramic material having a Ni compound incorporated in a $BaTiO_3$-$BaZrO_3$-$Bi_2O_3$-$TiO_2$ type solid solution. The ceramic capacitor composed of this material exhibits such characteristic properties as 0.60 $\mu F/cm^2$, tan $\delta$ 4.5%, an insulation resistance of 210 $M\Omega/cm^2$ (15 VDC after 15 seconds' standing), and a temperature characteristic (%) of electrostatic capacity at $-30°$ to $85°$ C. within $\pm 30\%$.

Reduction-reoxidation type semiconductive ceramic capacitors with even better properties are, however, desired. In the industry, therefore, there is a desire to develop a ceramic composition which has, as essential requirements, a breakdown voltage of not less than 400 V and a temperature characteristic within $\pm 30\%$ and possessing the characteristics of a large capacity per unit area and a low dielectric loss. Various studies are now under way in search for such a composition. In the reduction-reoxidation type semiconductive ceramic capacitor, generally the thin dielectric layer in the surface region has a very great influence on the capacity, the temperature characteristic of the capacity, the insulation resistance, the breakdown voltage, and the dielectric loss. The capacity per unit surface area increases and the insulation resistance and the breakdown voltage decrease when the thickness of the dielectric layer decreases. For increasing the insulation resistance and the breakdown voltage, it is necessary to increase the thickness of the dielectric layer and as a result, the capacity per unit surface area decreases. The dielectric loss of the capacitor depends on the magnitude tan $\delta$, of the dielectric layer. The DC resistance in the boundary between the dielectric layer and the semiconductive ceramic article contributes more to the dielectric loss. For the magnitude of tan $\delta$ to be decreased, this DC resistance must be decreased. Particularly, since the magnitude tan $\delta$ constitutes an important characteristic for the capacitor, an increase in this magnitude forms a serious drawback. The largest possible decrease of this magnitude is the most significant task in the improvement of various properties. Success in this task requires the development of a novel ceramic composition whose insulation resistance and breakdown voltage per unit thickness of dielectric layer are high, whose DC resistance is low and whose capacity is high. To be specific, the composition must possess characteristic properties of not less than 400 V of breakdown voltage, not less than $10^9 \Omega$ of insulation resistance, not less than 0.65 $\mu F/cm^2$ of capacity per unit surface area and less than 2.5% of tan $\delta$.

OBJECT AND SUMMARY OF THE INVENTION

The inventors have continued various studies in search of a composition for ceramic capacitors which meet the above requirements. This invention has been perfected as a result. To be specific, this invention is directed to a composition for a reduction-reoxidation type semiconductive ceramic capacitor consisting substantially of 100 mol % of a barium composite oxide consisting of $BaTiO_3$ and $BaZrO_3$ and having a $BaZrO_3$ content in the range of 0 to 20 mol %, 0.3 to 3.0 mol % of $Bi_2O_3$, and 0.1 to 8.5 mol % $TiO_2$ or $ZrO_2$ and further comprising 0.001 to 1.00% by weight of at least one of the oxides of Cr, Fe, Co, Zn, Cu, Al, Si, and Mg.

DETAILED DESCRIPTION OF THE PREFERRED EMBODIMENTS

Now, the components of the composition of this invention will be described below. As is well known in the art, $BaTiO_3$ is a main component of compositions of this class. A composition having up to 20 mol % of the $BaTiO_3$ content thereof substituted with $BaZrO_3$ exhibits lower variation of capacity with temperature. This substitution serves the purpose of improving the temperature characteristic of the composition's capacity. If the amount of this substitution exceeds 20 mol %, however, the Curie point falls below $0°$ C. and consequently the temperature characteristic comes to exceed $\pm 30\%$.

$Bi_2O_3$ has the effect of flattening the temperature characteristic of capacity of a dielectric ceramic article and moving the Curie point. This compound fails to manifest this effect when the amount incorporated is less than the lower limit of the range mentioned above. If the amount exceeds the upper limit of the range, the amount thereof evaporated in the course of sintering is unduly large so that the composition is no longer fit for use in a ceramic capacitor. The amount of $Bi_2O_3$ is preferably in the range of 0.5 to 2.5 mol %.

$TiO_2$ or $ZrO_2$ is effective in flattening the temperature characteristic of capacity of the dielectric ceramic article, lowering the reducing temperature, and lowering the specific resistance of the ceramic article itself. If the amount of this compound incorporated is smaller than the lower limit of the range mentioned above, it fails to manifest the effect. If this amount is unduly large, the dielectric constant is low and the insulation resistance is also low. The amount of $TiO_2$ or $ZrO_2$, therefore, is preferably in the range of 0.3 to 7.5 mol %.

The incorporation of at least one of the oxides of Cr, Fe, Co, Zn, Cu, Al, Si, and Mg characterizes the composition of this invention. Owing to this incorporation, the breakdown voltage, the insulation resistance, and the capacity per unit surface area are improved in a large measure and the magnitude of tan δ is decreased to an extremely low level.

It has been confirmed by experiment that the amount of this oxide to be added for producing a desirable effect is in the range of 0.001 to 1.00% by weight, preferably 0.005 to 0.80% by weight, based on the total amount of the composition mentioned above.

For the production of the reduction-reoxidation type semiconductive ceramic capacitor from the ceramic composition described above, it suffices to use the method heretofore in common use. First, an insulating ceramic article is produced by firing the composition defined above at a temperature in the range of 1,200° to 1,400° C. for a period in the range of 1 to 4 hours. Then, this insulating ceramic article is converted into a semiconductor by a treatment performed in the current of a reducing gas such as, for example, hydrogen, carbon monoxide, or ammonia or in the current of a mixed gas consisting of the reducing gas and an inert gas such as nitrogen gas or argon at a temperature in the range of 900° to 1,250° C. for a period in the range of 0.5 to 10 hours. The semiconductor is further heat treated in the air at 700° to 1,200° C. for a period in the range of 0.25 to 5 hours to form a thin reoxidized layer or dielectric layer in the surface part of the semiconductive ceramic article. A reduction-reoxidation type semiconductive ceramic capacitor is completed by applying silver paste destined to form electrodes on the semiconductive article and firing the applied silver paste.

The composition of this invention possesses excellent properties for a capacitor as compared with the conventional composition. It exhibits highly satisfactory properties such as a temperature characteristic of capacity of within ±30%, breakdown voltage of not less than 400 V, an insulation resistance of not less than $10^9\Omega$, a capacity of not less than 0.65 $\mu F/cm^2$ and, in spite of these high magnitudes, manifests a magnitude of tan δ of not more than 2.5%. Owing to these characteristic properties, the composition is capable of producing a reduction-reoxidation type semiconductive ceramic capacitor enjoying a high dielectric constant and a low dielectric loss without the sacrifice of the other properties.

EXAMPLES 1 TO 18

$BaCO_3$ powder (not less than 99.0% in purity), $TiO_2$ powder (not less than 99.0% in purity), $ZrO_2$ powder (not less than 99.0% in purity), and $Bi_2O_3$ powder (not less than 99.0% in purity), which are commercially available industry-grade raw materials, and $Cr_2O_3$, $Fe_2O_3$, CoO, ZnO, CuO, $Al_2O_3$, $SiO_2$, and MgO, which are commercially available powders of guaranteed reagent grade, were mixed in various percentage compositions indicated in Table 1 and wet blended using a pot and nylon balls. The resultant compositions were dried and calcined at a temperature of 1,150° C. for four hours. The calcination products were wet pulverized, dried, and mixed with an aqueous polyvinyl alcohol solution as a binder, and then classified to collect particles of 32-mesh pass. In each case, the classified particles were formed in the shape of a disc 9.5 mm in diameter and 0.5 mm in thickness under a pressure of about 1 ton/cm² and a circular dielectric ceramic article about 8.0 mm in diameter and about 0.4 mm in thickness was obtained by firing the disc in the air at 1,350° C. for two hours and then heat treating it in the flow of a mixed gas of 90% of $N_2$ and 10% of $H_2$ at a temperature of 1,050° C. for two hours to be converted into a ceramic semiconductor. Subsequently, this semiconductive ceramic article was heat treated in the air at a temperature of 1,000° C. for one hour. A capacitor element was obtained by attaching silver electrodes by firing one each to the opposite surfaces of the resultant reduction-reoxidation type semiconductive ceramic article. This capacity element was tested for capacity, C, dielectric loss, tan δ (under the conditions of 0.1 V of alternating current and 1 kHz of frequency), insulation resistance, IR (under applied pressure of DC 10V), and insulation breakdown voltage $V_B$. The results were as shown in Table 1.

TABLE 1

| Example No. | A (mol %) | | | | B (weight % to A) | | | | | | | |
|---|---|---|---|---|---|---|---|---|---|---|---|---|
| | $BaTiO_3$ | $BaZrO_3$ | $Bi_2O_3$ | $TiO_2$ | $Cr_2O_3$ | $Fe_2O_3$ | CoO | ZnO | CuO | $Al_2O_3$ | $SiO_2$ | MgO |
| 1 | 100 | | 0.5 | 0.3 | 0.01 | | | | | | | |
| 2 | 100 | | 1.0 | 3.0 | | 0.01 | | | | | | |
| 3 | 100 | | 1.0 | 5.0 | | | 0.01 | | | | | |
| 4 | 100 | | 1.5 | 4.5 | | | | 0.1 | | | | |
| 5 | 100 | | 1.5 | 6.0 | | | | | 0.1 | | | |
| 6 | 100 | | 2.0 | 6.0 | | | | | | 0.1 | | |
| 7 | 100 | | 2.5 | 7.5 | | | | | | | 0.1 | |
| 8 | 95 | 5 | 1.0 | 4.0 | | | | | | | | 0.1 |
| 9 | 95 | 5 | 1.5 | 6.0 | 0.2 | | | | | | | |
| 10 | 90 | 10 | 0.5 | 1.0 | | 0.3 | | | | | | |
| 11 | 90 | 10 | 1.0 | 3.0 | | | 0.4 | | | | | |
| 12 | 90 | 10 | 1.0 | 5.0 | | | | 0.5 | | | | |
| 13 | 85 | 15 | 0.5 | 0.5 | | | | | 0.6 | | | |
| 14 | 85 | 15 | 1.0 | 2.0 | | | | | | 0.7 | | |
| 15 | 85 | 15 | 2.5 | 4.0 | | | | | | | 0.8 | |
| 16 | 82 | 18 | 1.0 | 3.0 | | | | | | | | 0.2 |
| 17 | 82 | 18 | 2.0 | 5.0 | 0.01 | | 0.01 | | | | | |
| 18 | 82 | 18 | 2.5 | 7.5 | | 0.01 | | 0.01 | | | | |

| Example No. | C ($\mu F/cm^2$) | tan δ (%) | IR (Ω) | $V_B$ (V) | $T_C$ (%) |
|---|---|---|---|---|---|
| 1 | 0.68 | 2.4 | $3.3 \times 10^9$ | 460 | <±24 |
| 2 | 0.71 | 2.3 | $2.1 \times 10^9$ | 440 | <±22 |
| 3 | 0.70 | 2.2 | $3.9 \times 10^9$ | 400 | <±26 |
| 4 | 0.67 | 2.4 | $2.5 \times 10^9$ | 410 | <±27 |
| 5 | 0.72 | 2.1 | $3.4 \times 10^9$ | 420 | <±25 |
| 6 | 0.69 | 2.0 | $4.6 \times 10^9$ | 490 | <±25 |
| 7 | 0.70 | 2.2 | $3.9 \times 10^9$ | 470 | <±23 |

TABLE 1-continued

| No. | C ($\mu F/cm^2$) | tan δ (%) | IR (Ω) | $V_B$ (V) | $T_C$ (%) |
|---|---|---|---|---|---|
| 8 | 0.68 | 2.2 | $2.7 \times 10^9$ | 510 | <±26 |
| 9 | 0.68 | 2.4 | $3.5 \times 10^9$ | 480 | <±24 |
| 10 | 0.70 | 2.3 | $3.0 \times 10^9$ | 410 | <±23 |
| 11 | 0.69 | 2.2 | $3.8 \times 10^9$ | 450 | <±24 |
| 12 | 0.67 | 2.3 | $4.1 \times 10^9$ | 500 | <±23 |
| 13 | 0.68 | 2.1 | $3.0 \times 10^9$ | 470 | <±23 |
| 14 | 0.70 | 2.3 | $1.9 \times 10^9$ | 430 | <±26 |
| 15 | 0.67 | 1.9 | $3.4 \times 10^9$ | 450 | <±25 |
| 16 | 0.68 | 2.3 | $3.7 \times 10^9$ | 460 | <±26 |
| 17 | 0.70 | 2.4 | $2.8 \times 10^9$ | 430 | <±27 |
| 18 | 0.69 | 2.2 | $3.1 \times 10^9$ | 450 | <±25 |

COMPARATIVE EXPERIMENTS 1 TO 18

The same raw materials as used in Examples 1 to 18 were mixed to obtain compositions indicated in Table 2. Capacitor elements were produced and tested for the properties by following the procedure of Examples 1 to 18. The results were as shown in Table 2.

EXAMPLES 19 TO 36

The same raw materials as used in Examples 1 to 18 were mixed to obtain compositions indicated in Table 3. Capacitor elements were produced and tested for the properties by following the procedure of Examples 1 to 18. The results were as shown in Table 3.

TABLE 2

| Comparative Experiment No. | (mol %) | | | | C ($\mu F/cm^2$) | tan δ (%) | IR (Ω) | $V_B$ (V) | $T_C$ (%) |
| | $BaTiO_3$ | $BaZrO_3$ | $Bi_2O_3$ | $TiO_2$ | | | | | |
|---|---|---|---|---|---|---|---|---|---|
| 1 | 100 | | 0.5 | 0.3 | 0.48 | 3.4 | $5.6 \times 10^8$ | 320 | <±24 |
| 2 | 100 | | 1.0 | 3.0 | 0.44 | 3.7 | $7.9 \times 10^8$ | 390 | <±26 |
| 3 | 100 | | 1.0 | 5.0 | 0.53 | 4.2 | $5.7 \times 10^8$ | 380 | <±27 |
| 4 | 100 | | 1.5 | 4.5 | 0.48 | 3.9 | $4.9 \times 10^8$ | 360 | <±25 |
| 5 | 100 | | 1.5 | 6.0 | 0.43 | 3.5 | $6.0 \times 10^8$ | 370 | <±28 |
| 6 | 100 | | 2.0 | 6.0 | 0.47 | 4.0 | $6.5 \times 10^8$ | 360 | <±26 |
| 7 | 100 | | 2.5 | 7.5 | 0.46 | 3.8 | $5.9 \times 10^8$ | 370 | <±25 |
| 8 | 95 | 5 | 1.0 | 4.0 | 0.45 | 3.3 | $5.2 \times 10^8$ | 340 | <±24 |
| 9 | 95 | 5 | 1.5 | 6.0 | 0.43 | 3.9 | $5.7 \times 10^8$ | 350 | <±26 |
| 10 | 90 | 10 | 0.5 | 1.0 | 0.47 | 4.2 | $4.3 \times 10^8$ | 330 | <±24 |
| 11 | 90 | 10 | 1.0 | 3.0 | 0.42 | 3.6 | $8.0 \times 10^8$ | 410 | <±27 |
| 12 | 90 | 10 | 1.0 | 5.0 | 0.45 | 3.8 | $7.1 \times 10^8$ | 390 | <±25 |
| 13 | 85 | 15 | 0.5 | 0.5 | 0.44 | 4.0 | $5.3 \times 10^8$ | 380 | <±24 |
| 14 | 85 | 15 | 1.0 | 2.0 | 0.43 | 3.9 | $5.8 \times 10^8$ | 400 | <±25 |
| 15 | 85 | 15 | 2.5 | 4.0 | 0.41 | 3.7 | $6.2 \times 10^8$ | 390 | <±26 |
| 16 | 82 | 18 | 1.0 | 3.0 | 0.46 | 3.8 | $5.3 \times 10^8$ | 350 | <±25 |
| 17 | 82 | 18 | 2.0 | 5.0 | 0.44 | 3.9 | $4.9 \times 10^8$ | 330 | <±26 |
| 18 | 82 | 18 | 2.5 | 7.5 | 0.45 | 3.9 | $5.0 \times 10^8$ | 380 | <±26 |

TABLE 3

| Example No. | A (mol %) | | | | B (weight % to A) | | | | | | | |
| | $BaTiO_3$ | $BaZrO_3$ | $Bi_2O_3$ | $ZrO_2$ | $Cr_2O_3$ | $Fe_2O_3$ | CoO | ZnO | CuO | $Al_2O_3$ | $SiO_2$ | MgO |
|---|---|---|---|---|---|---|---|---|---|---|---|---|
| 19 | 100 | | 0.5 | 0.3 | 0.01 | | | | | | | |
| 20 | 100 | | 1.0 | 3.0 | | 0.01 | | | | | | |
| 21 | 100 | | 1.0 | 5.0 | | | 0.01 | | | | | |
| 22 | 100 | | 1.5 | 4.5 | | | | 0.1 | | | | |
| 23 | 100 | | 1.5 | 6.0 | | | | | 0.1 | | | |
| 24 | 100 | | 2.0 | 6.0 | | | | | | 0.1 | | |
| 25 | 100 | | 2.5 | 7.5 | | | | | | | 0.1 | |
| 26 | 95 | 5 | 1.0 | 4.0 | | | | | | | | 0.1 |
| 27 | 95 | 5 | 1.5 | 6.0 | 0.2 | | | | | | | |
| 28 | 90 | 10 | 0.5 | 1.0 | | 0.3 | | | | | | |
| 29 | 90 | 10 | 1.0 | 3.0 | | | 0.4 | | | | | |
| 30 | 90 | 10 | 1.0 | 5.0 | | | | 0.5 | | | | |
| 31 | 85 | 15 | 0.5 | 0.5 | | | | | 0.6 | | | |
| 32 | 85 | 15 | 1.0 | 2.0 | | | | | | 0.7 | | |
| 33 | 85 | 15 | 2.5 | 4.0 | | | | | | | 0.8 | |
| 34 | 82 | 18 | 1.0 | 3.0 | | | | | | | | 0.2 |
| 35 | 82 | 18 | 2.0 | 5.0 | 0.01 | 0.01 | | | | | | |
| 36 | 82 | 18 | 2.5 | 7.5 | | 0.01 | 0.01 | | | | | |

| Example No. | C ($\mu F/cm^2$) | tan δ (%) | IR (Ω) | $V_B$ (V) | $T_C$ (%) |
|---|---|---|---|---|---|
| 19 | 0.69 | 2.2 | $4.1 \times 10^9$ | 430 | <±23 |
| 20 | 0.67 | 2.3 | $3.8 \times 10^9$ | 480 | <±24 |
| 21 | 0.72 | 2.1 | $3.7 \times 10^9$ | 440 | <±26 |
| 22 | 0.69 | 2.2 | $4.5 \times 10^9$ | 470 | <±25 |
| 23 | 0.70 | 2.4 | $2.5 \times 10^9$ | 410 | <±23 |
| 24 | 0.68 | 2.2 | $2.0 \times 10^9$ | 420 | <±24 |
| 25 | 0.73 | 2.3 | $2.3 \times 10^9$ | 430 | <±24 |
| 26 | 0.71 | 2.2 | $3.5 \times 10^9$ | 420 | <±26 |
| 27 | 0.67 | 1.9 | $3.0 \times 10^9$ | 470 | <±27 |

TABLE 3-continued

| | | | | | |
|---|---|---|---|---|---|
| 28 | 0.68 | 2.2 | $3.6 \times 10^9$ | 490 | $< \pm 24$ |
| 29 | 0.70 | 2.3 | $4.2 \times 10^9$ | 430 | $< \pm 26$ |
| 30 | 0.69 | 2.2 | $4.0 \times 10^9$ | 450 | $< \pm 24$ |
| 31 | 0.70 | 2.4 | $3.9 \times 10^9$ | 460 | $< \pm 25$ |
| 32 | 0.71 | 2.3 | $1.9 \times 10^9$ | 440 | $< \pm 26$ |
| 33 | 0.66 | 2.0 | $3.8 \times 10^9$ | 510 | $< \pm 27$ |
| 34 | 0.68 | 2.2 | $4.7 \times 10^9$ | 480 | $< \pm 25$ |
| 35 | 0.72 | 2.3 | $2.1 \times 10^9$ | 440 | $< \pm 26$ |
| 36 | 0.70 | 2.3 | $2.4 \times 10^9$ | 430 | $< \pm 24$ |

COMPARATIVE EXPERIMENTS 19 TO 36

The same raw materials as used in Examples 1 to 18 were mixed to obtain compositions indicated in Table 4. Capacitor elements were produced and tested for the properties by following the procedure of Examples 1 to 18. The results were as shown in Table 4.

TABLE 4

| Comparative Experiment No. | (mol %) | | | | $C\ (\mu F/cm^2)$ | $\tan\delta\ (\%)$ | IR ($\Omega$) | $V_B$ (V) | $T_C$ (%) |
|---|---|---|---|---|---|---|---|---|---|
| | $BaTiO_3$ | $BaZrO_3$ | $Bi_2O_3$ | $ZrO_2$ | | | | | |
| 19 | 100 | | 0.5 | 0.3 | 0.47 | 3.5 | $4.5 \times 10^8$ | 340 | $< \pm 26$ |
| 20 | 100 | | 1.0 | 3.0 | 0.43 | 4.3 | $5.3 \times 10^8$ | 390 | $< \pm 25$ |
| 21 | 100 | | 1.0 | 5.0 | 0.46 | 3.9 | $4.2 \times 10^8$ | 370 | $< \pm 27$ |
| 22 | 100 | | 1.5 | 4.5 | 0.45 | 4.1 | $3.9 \times 10^8$ | 310 | $< \pm 23$ |
| 23 | 100 | | 1.5 | 6.0 | 0.44 | 4.0 | $4.4 \times 10^8$ | 330 | $< \pm 21$ |
| 24 | 100 | | 2.0 | 6.0 | 0.45 | 3.8 | $3.5 \times 10^8$ | 320 | $< \pm 24$ |
| 25 | 100 | | 2.5 | 7.5 | 0.42 | 4.5 | $5.7 \times 10^8$ | 410 | $< \pm 23$ |
| 26 | 95 | 5 | 1.0 | 4.0 | 0.43 | 4.2 | $3.9 \times 10^8$ | 380 | $< \pm 22$ |
| 27 | 95 | 5 | 1.5 | 6.0 | 0.44 | 4.2 | $4.3 \times 10^8$ | 360 | $< \pm 21$ |
| 28 | 90 | 10 | 0.5 | 1.0 | 0.41 | 4.0 | $5.9 \times 10^8$ | 320 | $< \pm 22$ |
| 29 | 90 | 10 | 1.0 | 3.0 | 0.42 | 3.9 | $6.3 \times 10^8$ | 350 | $< \pm 23$ |
| 30 | 90 | 10 | 1.0 | 5.0 | 0.44 | 3.8 | $6.1 \times 10^8$ | 360 | $< \pm 24$ |
| 31 | 85 | 15 | 0.5 | 0.5 | 0.48 | 3.5 | $3.5 \times 10^8$ | 330 | $< \pm 25$ |
| 32 | 85 | 15 | 1.0 | 2.0 | 0.42 | 3.9 | $2.9 \times 10^8$ | 310 | $< \pm 21$ |
| 33 | 85 | 15 | 2.5 | 4.0 | 0.41 | 3.7 | $3.7 \times 10^8$ | 390 | $< \pm 27$ |
| 34 | 82 | 18 | 1.0 | 3.0 | 0.44 | 3.6 | $3.6 \times 10^8$ | 370 | $< \pm 24$ |
| 35 | 82 | 18 | 2.0 | 5.0 | 0.43 | 4.2 | $4.8 \times 10^8$ | 400 | $< \pm 26$ |
| 36 | 82 | 18 | 2.5 | 7.5 | 0.44 | 4.0 | $5.1 \times 10^8$ | 340 | $< \pm 23$ |

As clearly noted from the preceding tables, the compositions according to this invention possess truly outstanding properties for the reduction-reoxidation type semiconductive ceramic capacitor. The composition of Example 5 shown in Table 1, for instance, exhibited an extremely small dielectric loss, tan δ, of 2.1%, though it possessed a temperature characteristic of within ±25% of capacity, a large capacity of 0.72 μF/cm², a large insulation resistance of $3.4 \times 10^9 \Omega$, and a large breakdown voltage, $V_B$, of 420 V. In contrast, the composition of Comparative Experiment 5 incorporating no CuO therein exhibited a large dielectric loss, tan δ, of 3.5% though it possessed a temperature characteristic within ±28% of capacity, a small insulation resistance of $6.0 \times 10^8 \Omega$, a small breakdown voltage, $V_B$, of 370 V, and a small capacity of 0.43 μF/cm².

The composition of Example 21 shown in Table 3 exhibited a very small dielectric loss, tan δ, of 2.1% though it possessed a large temperature characteristic within ±26% of capacity, a large capacity of 0.72 μF/cm², a large insulation resistance of $3.7 \times 10^9 \Omega$, and a large breakdown voltage, $V_B$, of 440 V. In contrast, the composition of Comparative Experiment 21 incorporating no CoO therein exhibited a large dielectric loss, tan δ, of 3.9% though it possessed a small temperature characteristic within ±27% of capacity, a small insulation resistance of $4.2 \times 10^8 \Omega$, a small breakdown voltage, $V_B$, of 370 V, and a small capacity of 0.46 μF/cm².

What is claimed is:

1. A composition for a reduction-reoxidation type semiconductive ceramic capacitor, consisting substantially of 100 mol % of a barium composite oxide consisting of $BaTiO_3$ and $BaZrO_3$ and having a $BaZrO_3$ content in the range of 0 to 20 mol %, 0.3 to 3.0 mol % of $Bi_2O_3$, and 0.1 to 8.5 mol % of at least one member selected from the group consisting of $TiO_2$ and $ZrO_2$ and further incorporating therein 0.001 to 1.00% by weight of at least one member selected from the group consisting of the oxides of Cr, Fe, Co, Zn, Cu, Al, Si, and Mg.

2. A composition according to claim 1, wherein the proportion of $Bi_2O_3$ is in the range of 0.5 to 2.5 mol %.

3. A composition according to claim 1, wherein the proportion of at least one member selected from the group consisting of $TiO_2$ and $ZrO_2$ is in the range of 0.3 to 7.5 mol %.

4. A composition according to claim 1, wherein the content of at least one member selected from the group consisting of the oxides of Cr, Fe, Co, Zn, Cu, Al, Si, and Mg is in the range of 0.005 to 0.80% by weight.

* * * * *